UNITED STATES PATENT OFFICE.

EVERETT B. COOK, OF DANVERS, MASSACHUSETTS, ASSIGNOR TO FIBRE PRODUCTS COMPANY, OF BOSTON, MASSACHUSETTS, A CORPORATION OF MAINE.

COMPOSITION OF MATTER AND PROCESS OF MAKING SAME.

1,096,286.	Specification of Letters Patent.	Patented May 12, 1914.

No Drawing.	Application filed May 31, 1913.  Serial No. 770,961.

*To all whom it may concern:*

Be it known that I, EVERETT B. COOK, a citizen of the United States, residing at Danvers, county of Essex, State of Massachusetts, have invented an Improvement in Compositions of Matter and Processes of Making Same, of which the following is a description.

This invention relates to a novel composition of matter which is designed as a substitute for rubber or leather, and also to a process for making such composition of matter.

My novel composition of matter has many of the characteristics of both rubber and leather, as it is resilient, impervious to water, is tough and durable and has good wearing qualities and has the quality of holding stitches so that it can be sewed like leather.

My improved composition of matter can be manufactured much more cheaply than ordinary rubber and is also cheaper than good grades of leather. It can be used for all the ordinary purposes for which rubber or leather is used and forms in every way a very desirable substitute for leather or rubber.

The composition of matter relates to that general type which is made by incorporating a fibrous material with a rubber compound and one of the objects of the present invention is to provide a composition of matter of this type which can be vulcanized without causing any deterioration of the fibrous material.

In the preferred embodiment of my invention, I employ fiberized leather as the fibrous material which is to be incorporated with the rubber compound but I do not wish to be limited necessarily to fiberized leather.

In manufacturing my improved compound I first provide so-called fiberized leather, by which I mean leather which is reduced to its true or original fibrous condition, that is, leather in which the individual fibers thereof have been separated from each other but retained as far as possible in their full length. Any suitable leather may be used for producing the leather fibers but for the sake of cheapness I preferably make these leather fibers of scrap leather which has very little commercial value. For securing the best results I will preferably also employ leather having a long, tough and well developed fiber such, for example, as is found in "Union", "hemlock", "oak", sole leather, but any leather having a proper fiber may be employed. This reduction of the leather to its elementary fibers may be accomplished in any way without departing from my invention, but in practice I have found that leather can be satisfactorily reduced to this fibrous condition by being subjected to a treatment such as is described in United States Patent No. 845,721 granted February 26, 1907 to George E. Sovereign. Leather which is reduced to its elementary fibers in this manner has the fluffy appearance of wool or cotton. After securing the leather fibers as above described, I next mix these leather fibers with a rubber compound, which can be done by subjecting the rubber and the leather fibers to the action or an ordinary rubber grinding machine which, as is well-known, is provided with a pair of parallel, closely-arranged steam-heated metallic rollers driven at slightly different speeds, and between which the materials to be mixed are passed. While it will be possible to use different rubber compounds for this purpose, yet I prefer a rubber compound which is capable of vulcanization so that if desired the mixture of rubber and leather fibers may be subjected to a vulcanizing process. I have found that a rubber compound containing the following ingredients makes a suitable one for use in manufacturing my improved composition matter but I wish it understood that the proportions of the ingredients and the ingredients themselves may be varied somewhat without departing from the invention. For a ten-pound lot of the composition I may take one and three-quarters pounds of Pará or other equivalent rubber, two pounds of reclaimed rubber of good quality, four ounces of sulfur, one and seven-eighths pounds of a filler, such for instance, as diatomaceous earth or tripolite, and one and one-half pounds of litharge and a small quantity of coloring matter, such for instance, as lamp black or some other suitable material. The diatomaceous earth not only acts as a filler but it has binding qualities, it does not harden or injure the rubber in any way, it is comparatively light in weight and also has resiliency so that when it is embodied in the rubber, it not only furnishes the required filling but it also reduces the weight of the resultant mass, assists the rubber in binding the leather fibers together and adds to rather than detracts from the resilient qualities of the rubber. This rubber compound is made by mixing the above or the desired ingredients together in usual way, and thereafter the leather fibers in the proper proportion are added to the rubber compound. For a ten-pound lot of the composition, I will preferably use about two and one-half pounds of leather fiber although I wish again to state that this exact proportion is not essential. This leather fiber may be mixed with the rubber compound in an ordinary rubber grinding mill such as above described, but in order to retain the life of the leather, it is essential that the rollers of the rubber grinding mill should not be heated to such a temperature as to injure leather; in other words while it is essential to have the rolls hot in order to soften the rubber to permit the leather fibers to become mixed therewith, yet it is equally essential that the temperature should not be sufficiently hot to burn or injure the leather fibers in any way. The passing of the rubber compound and leather fibers repeatedly through the rubber grinding machine causes the fibers to be thoroughly intermixed with the rubber compound so that said fibers become united into a homogeneous sheet by the rubber binder. My invention, however, is not limited to this particular manner of thoroughly intermixing the leather fibers and the rubber compound as any suitable way of securing this end may be adopted. The product thus produced can be vulcanized, if vulcanization is desirable. Where the product is to be vulcanized it is essential that this should be done at a temperature which while sufficient to accomplish the vulcanizing process is still insufficient to burn or injure in any way the leather fibers. I find from experience that a temperature of approximately 135° Fahrenheit will meet these requirements, although this exact temperature is not essential and can be varied so long as it is sufficient to accomplish the vulcanizing process without injuring or causing any deterioration of the leather fibers.

The composition produced as above is superior to rubber for many purposes such as soles for shoes, since it not only has the resiliency and water proof qualities of rubber but is lighter and tougher than rubber and has greater wearing qualities and also has a frictional grip which rubber does not have. Furthermore, it can be sewed like leather whereas ordinary rubber will not hold stitches. Moreover, the composition can be worked, polished and burnished like leather and will hold its edge during such processes whereas rubber will tend to crumble or chip when worked with edged tools.

My improved composition may be employed for foot wear, door mats, carriage steps, tread surfaces and innumerable other purposes for which rubber is often utilized.

While I have herein disclosed for purposes of illustration ingredients of one specific form of my composition and have described a particular way of compounding the same, yet it is to be understood that my invention is limited neither to the particular proportions nor to the particular ingredients herein described, nor to the detailed steps for compounding the said ingredients, and that various modifications may be made without departing from the spirit of the invention.

It is preferable to use a leather which is comparatively free from oil as the oily constituent of leather has a deleterious effect on rubber. I find that where leather is reduced to its elementary fibers, as above described, this process results in eliminating substantially all the oil that may be left in the leather, since the free access of the air to and between the separated fibers during and after the fiberizing action, tends to remove the oil by oxidization.

Having fully described my invention, what I claim as new and desire to secure by Letters Patent is:

1. A composition of matter comprising vulcanized rubber compound having distributed throughout its mass elementary leather fibers which retain all their natural toughness, strength and pliability.

2. A composition of matter comprising a vulcanized rubber compound having distributed throughout its mass elementary leather fibers which are in their normal condition and have been unaffected by heat.

3. The process of making a composition of matter which consists in intermixing elementary leather fibers with a vulcanizable rubber compound and then vulcanizing the product at a temperature which is insufficient to burn or otherwise injure the leather fibers.

4. The process of making a composition of matter which consists in intermixing elementary fibers with a vulcanizable rubber compound and then vulcanizing the product at a temperature which while sufficient to effect vulcanization of the rubber is yet insufficient to injure the fibers.

In testimony whereof, I have signed my name to this specification, in the presence of two subscribing witnesses.

EVERETT B. COOK.

Witnesses:
 Louis C. Smith,
 Thomas J. Drummond.